United States Patent
Joe

(10) Patent No.: US 7,236,457 B2
(45) Date of Patent: Jun. 26, 2007

(54) LOAD BALANCING IN A NETWORK

(75) Inventor: Robert Joe, Oceanside, CA (US)

(73) Assignee: Intel Corporation, Santa Clara, CA (US)

( * ) Notice: Subject to any disclaimer, the term of this patent is extended or adjusted under 35 U.S.C. 154(b) by 1057 days.

(21) Appl. No.: 10/264,529

(22) Filed: Oct. 4, 2002

(65) Prior Publication Data

US 2004/0066745 A1   Apr. 8, 2004

(51) Int. Cl.
*H04J 1/16* (2006.01)
(52) U.S. Cl. .................. 370/230; 370/386; 709/224
(58) Field of Classification Search ............. 370/232, 370/443, 392, 389, 356, 438, 229, 230, 386; 709/202, 227, 249, 223–226
See application file for complete search history.

(56) References Cited

U.S. PATENT DOCUMENTS

| | | | |
|---|---|---|---|
| 5,430,726 A | * | 7/1995 | Moorwood et al. ......... 370/438 |
| 6,952,401 B1 | * | 10/2005 | Kadambi et al. ........... 370/232 |
| 2003/0058880 A1 | * | 3/2003 | Sarkinen et al. ........... 370/413 |

* cited by examiner

*Primary Examiner*—John Pezzlo
(74) *Attorney, Agent, or Firm*—Kacvinsky LLC

(57) ABSTRACT

A method and apparatus to perform load balancing is described wherein a number of status packets are received from a set of cascaded devices and a plurality of process packets are received at one of the cascaded devices. A number of process packets are forwarded to another one of the cascaded devices in accordance with the number of status packets. The receiving comprises receiving one status packet per cascaded device. Other embodiments are described and claimed.

22 Claims, 3 Drawing Sheets

LOAD BALANCING IN A NETWORK

BACKGROUND

With the continued increase in Internet traffic, data centers have been utilizing network appliances to offload some of the more intensive processing tasks from servers. Network appliances typically intercept packets communicated between a client and a server, and have specialized hardware or software to increase processing speeds for certain types of packet data. For example, a network appliance may be specifically designed to process Secure Socket Layer (SSL) or Extensible Markup Language (XML) packets. In the case of an SSL network appliance, for example, the appliance may perform the processor intensive task of encrypting and decrypting data, thereby reducing processing demands on the server.

Network appliances may be cascaded to increase the overall processing power for a system. In addition, this may provide a form of fault tolerance. If one appliance becomes inoperative, the others may continue performing the intended task. To operate efficiently, cascaded network appliances typically require some form of load balancing to ensure work is properly distributed among the cascaded devices. Conventional solutions to perform load balancing, however, may be unsatisfactory for a number of reasons. For example, one solution may monitor certain threshold parameters for each appliance and allocate packets accordingly. As demands for faster packet processing increase, however, the threshold parameters may change faster than the load balancing algorithm can properly handle. Further, monitoring threshold parameters is premised upon statistical approximations for load balancing, and therefore may not operate as efficiently during practical implementation. Consequently, there may be a need for improved load balancing techniques to solve these and other problems.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Embodiments of the invention may comprise a method and apparatus to perform load balancing for a set of cascaded network devices, such as network appliances. The term "cascaded" as used herein may refer to devices that are connected in series or a chain topology. In one embodiment of the invention, load balancing for the cascaded network devices may be implemented using an upstream topology discovery protocol. The term "upstream" as used herein may refer to communicating packets in a direction from a server device to a client device. The term "downstream" as used herein may refer to communicating packets in a direction from a client device to a server device.

For example, one embodiment of the invention may perform load balancing using status packets. For example, assume N number of cascaded network appliances. Each network appliance may send a status packet every X seconds. The status packet may be sent in an upstream direction to the next cascaded network appliance. At any point in time, each network appliance will know how many cascaded appliances are in front of it, that is, between it and the server. If a particular network appliance has F cascaded appliances in front of it, then for every unit of work it processes, it may forward F units of work.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

Figure 1:
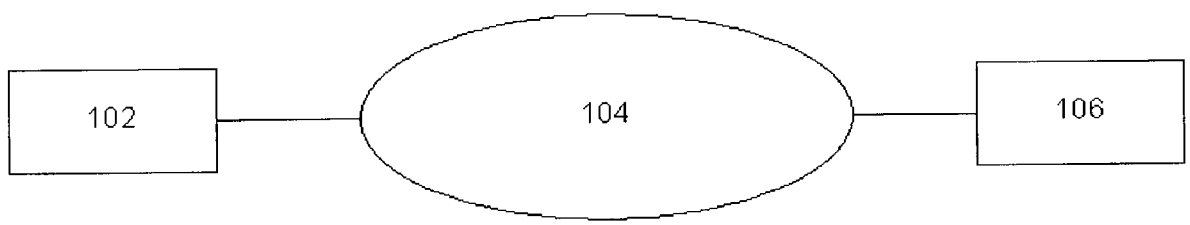
FIG. 1 is a system suitable for practicing one embodiment of the invention.

Referring now in detail to the drawings wherein like parts are designated by like reference numerals throughout, there is illustrated in FIG. 1 a system suitable for practicing one embodiment of the invention. FIG. 1 is a block diagram of a system 100 comprising a number of network nodes connected by one or more communications media and network 104. A network node ("node") in this context may include any device capable of communicating information, such as a computer, server, network appliance, switch, router, bridge, gateway and so forth. A communications medium may include to any medium capable of carrying information signals, such as twisted-pair wire, co-axial cable, fiber optics, radio frequencies, electronic, acoustic or optical signals, and so forth.

More particularly, system 100 may comprise a client node 102 and a server node 106 connected via a network 104. Although FIG. 1 shows only one client node, one server node and one network, it can be appreciated that any number of network nodes or networks may be used in system 100 and still fall within the scope of the invention.

Furthermore, the terms "connection" and "interconnection," and variations thereof, in this context may refer to physical connections and/or logical connections.

In one embodiment of the invention, system 100 may comprise a packet-switched network. Packet switching in this context may refer to communicating information over a network in the form of relatively short packets in accordance with one or more communications protocols. A packet in this context may refer to a set of information of a limited length, with the length typically represented in terms of bits or bytes. An example of a packet length might be 1000 bytes. A protocol may comprise a set of instructions by which the information signals are communicated over the communications medium. For example, the protocol might be a packet switching protocol such as the Transmission Control Protocol (TCP) as defined by the Internet Engineering Task Force (IETF) standard 7, Request For Comment (RFC) 793, adopted in September, 1981 ("TCP Specification"), and the Internet Protocol (IP) as defined by the IETF standard 5, RFC 791, adopted in September, 1981 ("IP Specification"), both available from "www.ietf.org" (collectively referred to as the "TCP/IP Specification"). Packets may be addressed using any number of protocols, such as the Internet Protocol Version Four (IPv4) addressing identified by the IP Specification, and the IETF Internet Protocol Version Six (IPv6) draft standard, RFC 2460, dated December 1998 ("IPv6 Specification"), also available from "www.ietf.org."

In one embodiment of the invention, client node 102 may comprise a node that originates a set of information for delivery to server node 106 via network 104. Information may comprise any data capable of being represented as a signal, such as an electrical signal, optical signal, acoustical signal and so forth. Examples of information in this context may include data from a voice conversation, videoconference, streaming video, electronic mail ("email") message, voice mail message, alphanumeric symbols, graphics, image, video, text and so forth. In one embodiment of the invention, client node 102 may comprise a personal computer (PC) having browser software, such as Microsoft Explorer. In this embodiment, client node 102 may request information stored by server node 106. An example of the requested information may include a Hypertext Markup Language (HTML) or XML document. Server node 106 may comprise a server computer that may store HTML or XML documents, and communicate the documents in accordance with one or more Internet Protocols as described above.

Network 104 may comprise one or more intermediate nodes. An intermediate node may comprise a node that communicates the information between client node 102 and server node 106. In some cases, there may be more than one client node, server node and/or intermediate node. For example, there may be a plurality of servers that comprise a server pool to provide a particular network service. In another example, network 104 typically comprises multiple intermediate nodes and networks between a client node and server node.

In general operation, client node 102 may send information to server node 106 via network 104 in accordance with the TCP/IP Specification. The client node may break a set of information into a series of packets. Each packet may contain a portion of the information plus some control information. The control information may assist intermediate nodes in network 104 to route each packet to the server node. Client node 102 may send the packets to an intermediate node that is part of network 104. The intermediate node may receive the packets, process the packets, and pass them to the next intermediate node or server node 106. Server node 106 may eventually receive the entire series of packets and may use them to reproduce the original information sent by client node 102.

Figure 2:
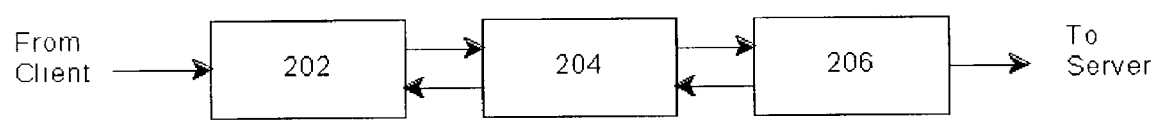
FIG. 2 is a block diagram of a system in accordance with one embodiment of the invention.

FIG. 2 is a block diagram of a set of cascaded intermediate nodes in accordance with one embodiment of the invention. FIG. 2 illustrates a system 200 that may be part of, for example, network 104. System 200 may comprise intermediate nodes 202, 204 and 206. Although only three intermediate nodes are shown as part of system 200, it can be appreciated that any number of intermediate nodes may be included and still fall within the scope of the invention.

In one embodiment of the invention, each intermediate node may be a network appliance, such as a XML or SSL accelerator, although the embodiments are not limited in this context. The network appliances may be cascaded to increase processing power and efficiency. Each network appliance may include, for example, a processing system to implement load balancing in accordance with the various embodiments of the invention. The embodiments may be implemented as software executed by a processor, hardware circuits or structures, or a combination of both. The processor may be a general-purpose or dedicated processor, such as a processor from the family of processors made by Intel Corporation, Motorola Incorporated, Sun Microsystems Incorporated and others. For example, in one embodiment of the invention the processor may be an Intel IXP2400 Network Processor, although the embodiments are not limited in this context. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

In one embodiment of the invention, nodes 202, 204 and 206 may communicate control information to each other in the form of status packets. A status packet may indicate the presence of each active node in system 200. The term "active node" as used herein may refer to a properly functioning network node. An "inactive node" may be a node that is inoperative due to various reasons, e.g., power failure, hardware failure, software failure and so forth. Each active node may send a status packet periodically in an upstream direction. For example, node 206 may send a status packet to nodes 204 and 202. Node 204 may send a status packet to node 202. Each node may use the status packets to determine the number of active nodes in front of it in system 200. For example, node 202 may receive two status packets, indicating there are two more active nodes in front of it. Similarly, node 204 may receive one status packet, indicating there is one more active node in front of it. Since node 206 fails to receive any status packets, it knows it is the last active node in system 200.

In one embodiment of the invention, the status packets may be used to distribute work among the active nodes. One example of work may be to process packets of information sent between network nodes, e.g., client node 102 and server node 106. In this embodiment, such packets may be referred to as "process packets." In operation, each node may determine the number of status packets it has received, and forward an equal number of process packets to the node in front of it.

The embodiments may provide several advantages over conventional solutions. For example, the embodiments may provide a fault tolerant technique to distribute the work evenly between all active nodes in system 200. The embodiments avoid the problems presented through the use of monitoring thresholds for one or more parameters. Further, if a node becomes an inactive node, the embodiments may automatically redistribute the work accordingly. Once the inactive node becomes an active node again, the embodiments may automatically redistribute the work to include the new active node. In addition, the embodiments move the load balancing work to layer 2 of the protocol stack. This not only provides increased flexibility and efficiency for distributing work among multiple nodes, but also provides additional processing cycles by moving this functionality from higher layers. These additional processing cycles may be dedicated to other tasks, e.g., processing packets in accordance with their primary function.

It can be appreciated that the number of process packets forwarded by a node may vary in accordance with a number of design parameters. For example, one of the active nodes in system 200 may have more processing power with respect to the other nodes. In this case, this active node may be configured to send multiple status packets on a periodic basis, thereby in effect receiving a greater portion of the overall work load. Thus, a weighting effect may be implemented by varying the number of status packets sent by any particular node.

The operations of systems 100 and 200 may be further described with reference to FIG. 3 and accompanying examples. Although FIG. 3 as presented herein may include a particular processing logic, it can be appreciated that the processing logic merely provides an example of how the general functionality described herein can be implemented. Further, each operation within a given processing logic does not necessarily have to be executed in the order presented unless otherwise indicated.

Figure 3:
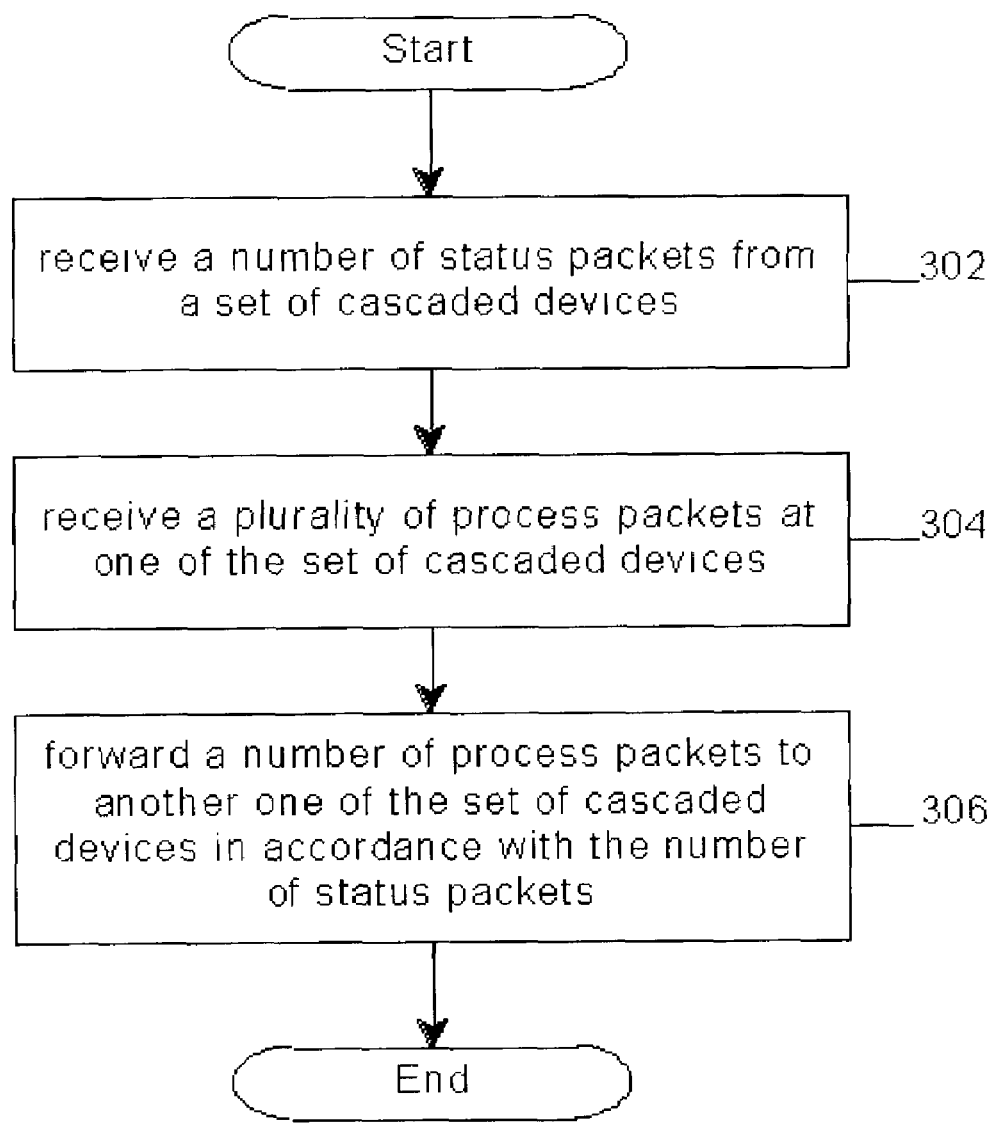
FIG. 3 is a block flow diagram of load balancing operations in accordance with one embodiment of the invention.

FIG. 3 illustrates a block flow diagram of load balancing operations performed in accordance with one embodiment of the invention. FIG. 3 illustrates a programming logic 300 to perform load balancing in accordance with one embodiment of the invention. As shown in programming logic 300, a number of status packets may be received from a set of cascaded devices at block 302. A plurality of process packets may be received at one of the set of cascaded devices at block 304. A number of process packets may be forwarded to another one of the set of cascaded devices in accordance with the number of status packets.

In one embodiment of the invention, the status packets may be received on a periodic basis. The period may be varied in accordance with the overall design parameters of the system, e.g., the rate at which a particular set of cascaded devices is expected to receive process packets.

In one embodiment of the invention, a node may receive one status packet per cascaded device. In this manner, work may be evenly distributed among the cascaded devices. In another embodiment of the invention, a node may receive more than one status packet from a cascaded device. In this manner, work may be unevenly distributed among the cascaded devices in accordance with the respective capabilities of a particular device.

In one embodiment of the invention, the status packets may be sent from one cascaded device to another cascaded device in an upstream direction. In this manner each cascaded device may determine how many other cascaded devices are between it and the server node. A cascaded device may then forward a number of process packets matching the number of status packets to another cascaded device, e.g., the next cascaded device in the chain topology. The process packets may be forwarded in a downstream direction, i.e., towards the server node.

In one embodiment of the invention, a cascaded device may be the last in the set of cascaded devices. In this case, the last cascaded device may not receive any status packets. Consequently, the absence of any status packets may indicate to the last cascaded device that it must process all process packets it receives. Alternatively, the last cascaded device may send a portion of the received process packets to a default device, e.g., the server itself if it has any idle processing capacity.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to perform load balancing, comprising:
   receiving a number of status packets from a set of cascaded devices;
   receiving a plurality of process packets at one of said set of cascaded devices;
   forwarding a number of process packets to another one of said set of cascaded devices in accordance with said number of status packets;
   wherein said receiving comprises receiving one status packet per cascaded device.

2. The method of claim 1, wherein said receiving comprises receiving said status packets on a periodic basis.

3. The method of claim 1, wherein said receiving comprises receiving more than one status packet from at least one of said set of cascaded devices.

4. The method of claim 1, wherein said receiving comprises receiving said status packets in an upstream direction from said set of cascaded devices.

5. A method to perform load balancing, comprising:
   receiving a number of status packets from a set of cascaded devices;
   receiving a plurality of process packets at one of said set of cascaded devices;
   forwarding a number of process packets to another one of said set of cascaded devices in accordance with said number of status packets;
   wherein said forwarding comprises forwarding a number of process packets matching said number of status packets.

6. The method of claim 5, wherein said forwarding comprises forwarding said process packets in a downstream direction to one of said set of cascaded devices.

7. A method to perform load balancing, comprising:
   receiving a number of status packets from a set of cascaded devices;
   receiving a plurality of process packets at one of said set of cascaded devices;
   forwarding a number of process packets to another one of said set of cascaded devices in accordance with said number of status packets;
   wherein said forwarding comprises determining whether a device in said set of cascaded devices remains in a downstream direction; and
   forwarding said process packets in accordance with said determination.

8. The method of claim 7, wherein said determining comprises:
   determining that a device in said set of cascaded devices does remain in said downstream direction, and
   forwarding said process packets to said device.

9. The method of claim 7, wherein said determining comprises:
   determining that a device in said set of cascaded devices does not remain in said downstream direction, and
   processing said process packets at said cascaded device receiving said status packets.

10. The method of claim 7, wherein said determining comprises:
   determining that a device in said set of cascaded devices does not remain in said downstream direction, and
   forwarding said process packets to a default device of said set of cascaded devices.

11. An article comprising:
   a computer storage medium;
   said computer storage medium including stored computer executable instructions that, when executed by a processor, result in performing load balancing by receiving a number of status packets from a set of cascaded devices, receiving a plurality of process packets at one of said set of cascaded devices, forwarding a number of process packets to another one of said set of cascaded devices in accordance with said number of status packets, and
   receiving one status packet per cascaded device.

12. The article of claim 11, wherein the stored instructions, when executed by a processor, further result in receiving said status packets on a periodic basis.

13. The article of claim 11, wherein the stored computer executable instructions, when executed by a processor, further result in receiving more than one status packet from at least one of said set of cascaded devices.

14. The article of claim 11, wherein the stored computer executable instructions, when executed by a processor, further result in receiving said status packets in an upstream direction from said set of cascaded devices.

15. An article comprising:
   a computer storage medium;
   said computer storage medium including stored computer executable instructions that, when executed by a processor, result in performing load balancing by receiving a number of status packets from a set of cascaded devices, receiving a plurality of process packets at one of said set of cascaded devices, forwarding a number of process packets to another one of said set of cascaded devices in accordance with said number of status packets, and
   forwarding a number of process packets matching said number of status packets.

16. The article of claim 15, wherein the stored computer executable instructions, when executed by a processor, further result in forwarding said process packets in a downstream direction to one of said set of cascaded devices.

17. A system, comprising:
   a computing platform adapted to perform load balancing;
   said platform being further adapted to performing load balancing by receiving a number of status packets from a set of cascaded devices, receiving a plurality of process packets at one of said set of cascaded devices, and forwarding a number of process packets to another one of said set of cascaded devices in accordance with said number of status packets;
   wherein said platform is further adapted to receiving one status packet per cascaded device.

18. The system of claim 17, wherein said platform is further adapted to receiving said status packets on a periodic basis.

19. The system of claim 17, wherein said platform is further adapted to receiving more than one status packet from at least one of said set of cascaded devices.

20. The system of claim 17, wherein said platform is further adapted to receiving said status packets in an upstream direction from said set of cascaded devices.

21. A system, comprising:
   a computing platform adapted to perform load balancing;
   said platform being further adapted to performing load balancing by receiving a number of status packets from a set of cascaded devices, receiving a plurality of process packets at one of said set of cascaded devices, and forwarding a number of process packets to another one of said set of cascaded devices in accordance with said number of status packets;
   wherein said platform is further adapted to forwarding a number of process packets matching said number of status packets.

22. The system of claim 21, wherein said platform is further adapted to forwarding said process packets in a downstream direction to one of said set of cascaded devices.

* * * * *